(12) United States Patent
Chen

(10) Patent No.: US 7,258,629 B2
(45) Date of Patent: Aug. 21, 2007

(54) CONNECTING STRUCTURE FOR WELDING A CLUB HEAD COMPONENT TO A GOLF CLUB HEAD BODY

(75) Inventor: Chan-Tung Chen, Kaohsiung (TW)

(73) Assignee: Nelson Precision Casting Co., Ltd., Kaohsiung (TW)

( * ) Notice: Subject to any disclaimer, the term of this patent is extended or adjusted under 35 U.S.C. 154(b) by 194 days.

(21) Appl. No.: 11/075,801

(22) Filed: Mar. 10, 2005

(65) Prior Publication Data

US 2006/0205533 A1    Sep. 14, 2006

(51) Int. Cl.
A63B 53/04    (2006.01)
(52) U.S. Cl. .................. 473/342; 473/345; 473/350; 473/338; 473/339
(58) Field of Classification Search .............. 473/345, 473/334–339, 349, 324–333, 340–344, 346–348, 473/350, 290–291
See application file for complete search history.

(56) References Cited

U.S. PATENT DOCUMENTS

| | | | |
|---|---|---|---|
| 5,871,408 A | | 2/1999 | Chen |
| 6,001,032 A | * | 12/1999 | Onuki et al. ................ 473/342 |
| 6,350,209 B1 | | 2/2002 | Chen |
| 6,458,045 B1 | * | 10/2002 | Chen ........................ 473/342 |
| 6,617,537 B1 | | 9/2003 | Chiu et al. |
| 6,780,124 B2 | | 8/2004 | Lu |
| 7,008,331 B2 | * | 3/2006 | Chen ........................ 473/342 |
| 2002/0004428 A1 | * | 1/2002 | Takeda ....................... 473/338 |
| 2003/0054901 A1 | | 3/2003 | Sun |
| 2003/0144080 A1 | * | 7/2003 | Yoneyama .................. 473/349 |
| 2004/0116208 A1 | * | 6/2004 | De Shiell et al. ........... 473/345 |
| 2005/0119068 A1 | * | 6/2005 | Onoda et al. ............... 473/342 |

* cited by examiner

*Primary Examiner*—Sebastiano Passaniti
(74) *Attorney, Agent, or Firm*—Birch, Stewart, Kolasch & Birch, LLP

(57) ABSTRACT

A golf club head includes a golf club head body and at least one club head component. The golf club head body provides with an assembling opening which includes a welding inner circumference, a supporting bottom periphery and a tapered portion. The club head component correspondingly provides with a welding outer circumference and a rear periphery. In welding, the welding inner circumference of the assembling opening is engaged with the welding outer circumference of the club head component, and the supporting bottom periphery of the assembling opening is further engaged with the rear periphery of the club head component. The tapered portion of the assembling opening is used to form a space for releasing inert gas from a welding portion in welding operation.

16 Claims, 5 Drawing Sheets

CONNECTING STRUCTURE FOR WELDING A CLUB HEAD COMPONENT TO A GOLF CLUB HEAD BODY

BACKGROUND OF THE INVENTION

1. Field of the Invention

The present invention relates to a connecting structure for welding a club head component to a golf club head body. Particularly, the present invention relates to an assembling opening of the golf club head body providing with a supporting bottom periphery for intensively supporting the club head component for welding operation. More particularly, the present invention relates to the assembling opening of the golf club head body further providing with a tapered portion used to release inert gas from a welding channel.

2. Description of the Related Art

U.S. Pat. No. 6,617,537, entitled "method for combining a golf club head and a ball striking plate," discloses following steps: separately prefabricating a golf club head body and a striking plate, the club head body forming an assembling opening with an inner circumference and a shoulder, and the striking plate having an outer circumference so that the inner circumference of the assembling opening corresponding to the outer circumference of the striking plate; commonly forming an inclined surface on each of the inner circumference of the assembling opening and the outer circumference of the striking plate, and the assembling opening further providing with an engaging protrusion; a block pressing the engaging protrusion for deformation after positioning the striking plate on the shoulder of the assembling opening; melting a boundary between the inner circumference of the assembling opening and the outer circumference of the striking plate; surface-finishing the golf club head body and the striking plate.

In welding operation, the golf club head and the striking plate may be selectively used a variety of welding methods, such as tungsten inert gas (TIG) welding, laser welding, plasma welding or other suitable welding methods. However, the welding operation needs using argon as a protection gas for covering a welding portion (i.e. welding channel). A surplus of the inert gas may remain between the assembling opening of the golf club head body and the striking plate if a rear surface of the striking plate closely confront with the shoulder of the assembling opening. Due to obstruction of the shoulder of the assembling opening, void defects may be generated in the welding portion that causes incomplete welding if the inert gas cannot be properly released from the welding portion. Consequently, the void defects may reduce welding intensity between the golf club head body and the striking plate, and deteriorate welding quality and reliability. Additionally, the elastic deformation of the striking plate may be ineffective while striking golf if the rear surface of the striking plate closely confront with the shoulder of the assembling opening.

Another U.S. Pat. No. 6,780,124, entitled "golf club head for welding," discloses a golf club head body and a striking plate. The golf club head includes an assembling opening at its front side, and the assembling opening provides with a filling protrusion on its periphery instead of a shoulder. The filling protrusion further includes a series of engaging notches disposed thereon. Correspondingly, the striking plate further includes a plurality of support rods mounted on a front surface thereof. In assembling operation, the striking plate is received in the assembling opening of the golf club head body, and the support rods of the striking plate are correspondingly engaged with the engaging notches of the filling protrusion of the assembling opening so as to position the striking plate on the golf club head body. Consequently, the striking plate and the golf club head body can be rapidly pre-assembled in preparing for a welding procedure. In welding operation, the inert gas remained in a clearance between an outer circumference of the striking plate and an inner circumference of the assembling opening of the golf club head body may be properly released through a rear surface of the striking plate since no shoulder of the assembling opening may obstruct the inert gas. Consequently, no void defect may be generated in the welding portion of the golf club head.

However, the support ribs of the striking plate and the engaging notches of the golf club head body may sophisticate the entire structure of the golf club head. Moreover, a deburring operation for eliminating the support ribs and the engaging notches is required and thus complicated the manufacture method for the golf club head after the welding operation. Accordingly, there is a need for improving and simplifying the welding structure of the golf club head.

The present invention intends to provide a connecting structure for welding a club head component to a golf club head body. The golf club head body provides with a welding inner circumference of an assembling opening while the club head component correspondingly provides with a welding outer circumference. Furthermore, the assembling opening of the golf club head body provides with a supporting bottom periphery for intensively supporting the club head component, and a tapered portion to form a space for releasing inert gas from a welding channel that may increase welding quality, intensity and reliability. Additionally, a buffer space of the golf club head body formed by the tapered portion of the assembling opening permits deformation of the club head component.

SUMMARY OF THE INVENTION

The primary objective of this invention is to provide a connecting structure for welding a club head component to a golf club head body. The golf club head body employs a welding inner circumference of an assembling opening to connect a welding outer circumference of the club head component. The assembling opening of the golf club head body further employs a supporting bottom periphery to support the club head component, and a tapered portion to form a space for releasing inert gas from a welding channel that may increase welding quality, intensity and reliability.

The secondary objective of this invention is to provide the connecting structure for welding a club head component to a golf club head body. The golf club head body employs a welding inner circumference of an assembling opening to connect a welding outer circumference of the club head component. The assembling opening of the golf club head body further employs a tapered portion to form a buffer space that permits deformation of the club head component while striking golf.

Another objective of this invention is to provide the connecting structure for welding a club head component to a golf club head body. The golf club head body employs a welding inner circumference of an assembling opening to connect a welding outer circumference of the club head component. The assembling opening of the golf club head body further employs supporting segments on a tapered portion to engage with a rear periphery of the club head component that may increase connection intensity and reliability.

The golf club head in accordance with the present invention includes a golf club head body and at least one club head component connected thereto. The golf club head body provides with an assembling opening which includes a welding inner circumference, a supporting bottom periphery and a tapered portion. The club head component correspondingly provides with a welding outer circumference and a rear periphery. In welding, the welding inner circumference of the assembling opening is engaged with the welding outer circumference of the club head component, and the supporting bottom periphery of the assembling opening is further engaged with the rear periphery of the club head component. The tapered portion of the assembling opening is used to form a space for releasing inert gas from a welding portion in welding operation.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
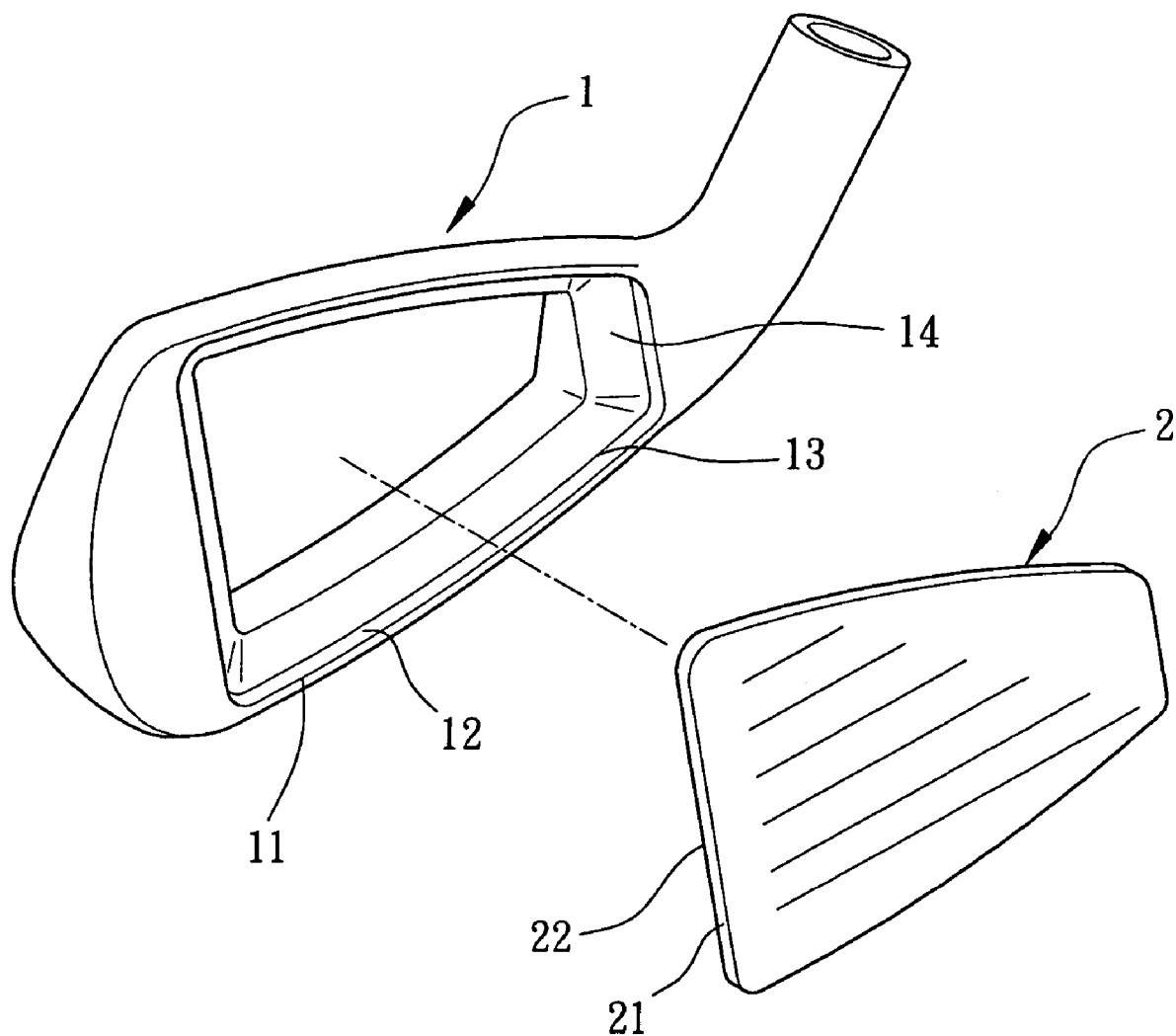
FIG. 1 is an exploded perspective view of a golf club head having a connecting structure for welding a striking plate (club head component) to a golf club head body in accordance with a first embodiment of the present invention.
Figure 2:
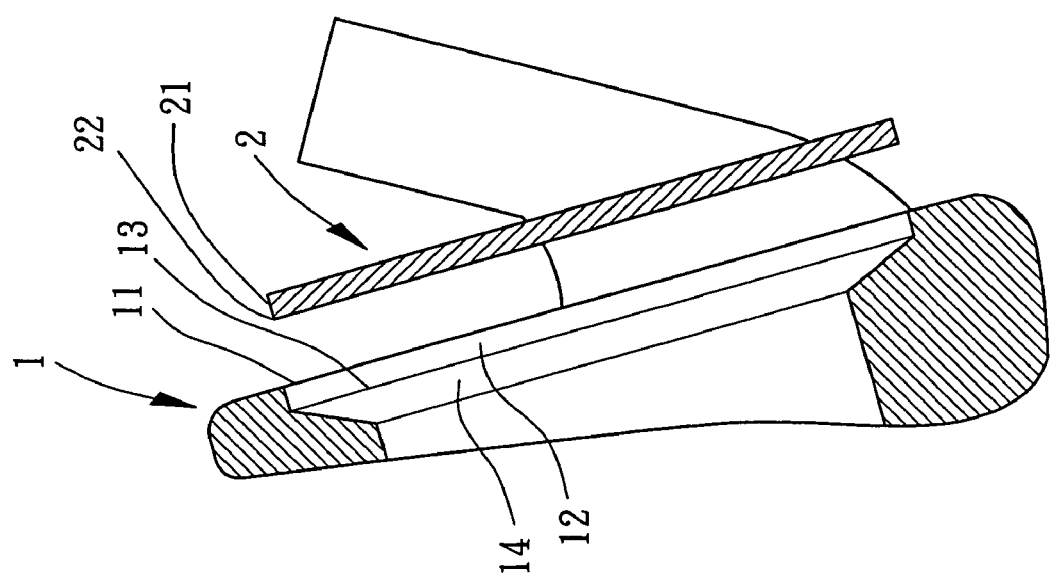
FIG. 2 is an exploded cross-sectional view of the golf club head having the connecting structure for welding the striking plate to the golf club head body in accordance with the first embodiment of the present invention.

Referring initially to FIGS. 1 and 2, a golf club head generally includes a golf club head body member designated numeral 1 and a striking plate member (club head component) designated numeral 2. The golf club head can be selected from a group consisting of an iron-type club head, a wood-type club head and a putter-type club head. In the following embodiment, a connecting structure in accordance with the present invention shall be only applied to the iron-type and wood-type club heads. It will be understood that the connecting structure applied to the putter-type club head in accordance with the present invention is omitted.

Referring again to FIGS. 1 and 2, the construction of the golf club head body 1 shall be described in detail. The golf club head body 1 is a monolithic body, and made of materials selected from a group consisting of stainless steel, carbon steel, maraging steel, tungsten alloy, nickel-based alloy and titanium alloy. The golf club head body 1 provides with an assembling opening 11 in place. In the illustrated first embodiment, the assembling opening 11 is integratedly formed on a front side of the golf club head body 1. The assembling opening 11 further includes a welding inner circumference 12, a supporting bottom periphery 13 and a tapered portion 14 successively formed therein. In assembling, the welding inner circumference 12 of the assembling opening 11 is used to confront with the striking plate 2. Located between the welding inner circumference 12 and the tapered portion 14 is the supporting bottom periphery 13. The tapered portion 14 is formed with an inclined flat surface or a curved surface defining a funnel-shaped member extending from the welding inner circumference 12 such that the tapered portion 14 is located at a rear side of the golf club head body 1. The tapered portion 14 continuously surrounds a rear portion of the assembling opening 11 of the golf club head body 1.

Still referring to FIGS. 1 and 2, the construction of the striking plate 2 shall be described in detail. The striking plate 2 may be a flat plate member regarded as a club head component, and made of materials selected from a group consisting of stainless steel, carbon steel, maraging steel, tungsten alloy, nickel-based alloy and titanium alloy. The striking plate 2 has a front surface and a rear surface disposed at its opposite sides. The front surface of the striking plate 2 is used to hit a golf ball (not shown). An annular edge of the striking plate 2 provides with a welding outer circumference 21 corresponding to the welding inner circumference 12 of the assembling opening 11. In assembling, the welding outer circumference 21 of the striking plate 2 is engaged with the welding inner circumference 12 of the assembling opening 11. Formed on a boundary between the welding outer circumference 21 and the rear surface of the striking plate 2 is a rear periphery 22 corresponding to the supporting bottom periphery 13 of the assembling opening 11. In assembling, the rear periphery 22 of the striking plate 2 is supported on the supporting bottom periphery 13 of the assembling opening 11.

Figure 3:
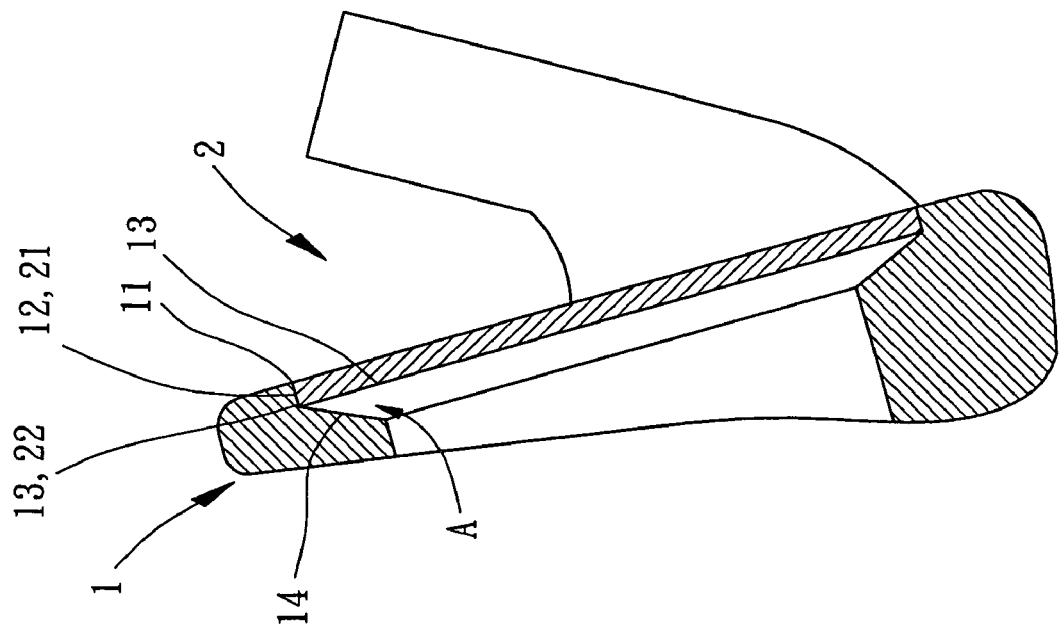
FIG. 3 is a cross-sectional view of the golf club head having the connecting structure connected the golf club head body with the striking plate, in welding operation, in accordance with the first embodiment of the present invention.

Turning now to FIG. 3, the assembling operation of the golf club head body 1 and the striking plate 2 shall be described in detail. In assembling, the striking plate 2 is inserted into the assembling opening 11 of the golf club head body 1 so that the striking plate 2 may be securely or releasably received in the assembling opening 11 of the golf club head body 1. When this occurs, the welding outer circumference 21 of the striking plate 2 and the welding inner circumference 12 of the assembling opening 11 are in perfect alignment with each other to define a welding channel for welding operation. Also, the rear periphery 22 of the striking plate 2 and the supporting bottom periphery 13 of the assembling opening 11 are in perfect engagement with each other. Because of this, the rear periphery 22 of the striking plate 2 is supported on the supporting bottom periphery 13 of the assembling opening 11. Defined between the rear surface of the striking plate 2 and the tapered portion 14 of the assembling opening 11 is a space "A." In the illustrated first embodiment, the engagement of the rear periphery 22 of the striking plate 2 with the supporting bottom periphery 13 of the assembling opening 11 serves to maintain an assembled relationship without a need for an additional structure in delimiting the space "A" in preparing for welding operation.

Still referring to FIG. 3, the welding operation of the striking plate 2 to the golf club head body 1 shall be described in detail. In welding operation, the golf club head 1 and the striking plate 2 may be selectively used a variety of welding methods, such as tungsten inert gas (TIG) welding, laser welding, plasma welding, electron beam welding or other suitable welding methods. An inert gas, such as argon, is used to protect welding portions of the golf club head 1 and the striking plate 2 (i.e. welding channel). During welding, heat may weld a welding material, or materials of the welding inner circumference 12 of the assembling opening 11 and the welding outer circumference 21 of the striking plate 2 themselves for welding the striking plate 2 to the golf club head body 1. Once welded, the inert gas remained between the welding inner circumference 12 of the assembling opening 11 and the welding outer circumference 21 of the striking plate 2 is discharged via the space "A" such that void defect or incomplete welding can be effectively avoided. Consequently, the welding structure of the golf club head body 1 for welding the striking plate 2 may increase welding quality, intensity and reliability.

Still referring to FIG. 3, the supporting bottom periphery 13 of the assembling opening 11 serves to maintain a line engagement with a sharpened edge of the rear periphery 22 of the striking plate 2 so as to provide adequate support for the striking plate 2. In addition, the space "A" delimited by the tapered portion 14 of the assembling opening 11 permits deformation of the striking plate 2 such that the striking ability of the golf club head is improved.

Figure 4:
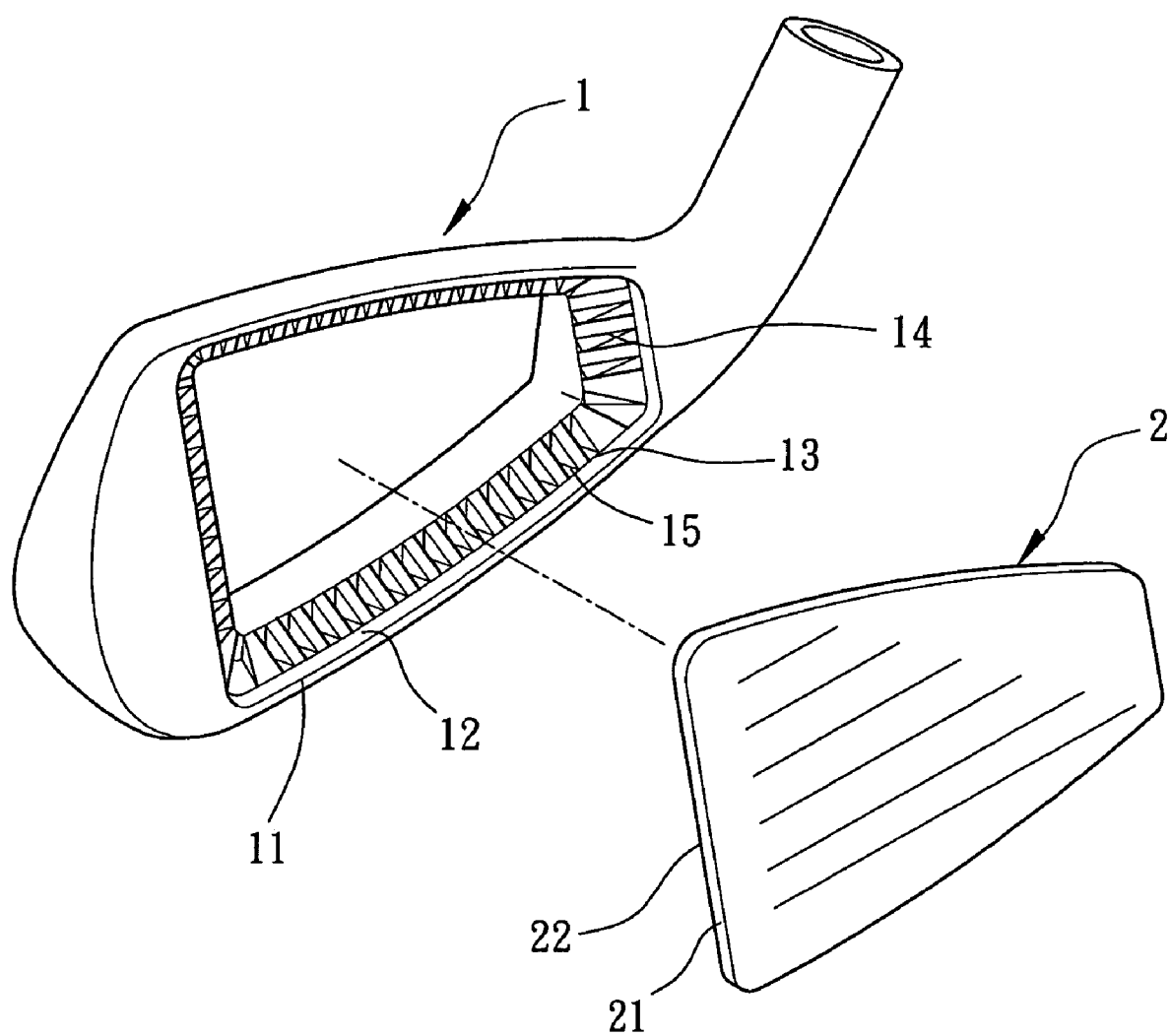
FIG. 4 is an exploded perspective view of a golf club head having another connecting structure for welding a striking plate (club head component) to a golf club head body in accordance with a second embodiment of the present invention.

Turning now to FIG. 4, reference numerals of the second embodiment of the present invention have applied the identical numerals of the first embodiment, as shown in FIG. 1. The construction of the golf club head structure in accordance with the second embodiment of the present invention has similar configuration and same function as that of the golf club head structure of the first embodiment and detailed descriptions may be omitted.

Referring again to FIG. 4, in comparison with the first embodiment, the tapered portion 14 of the assembling opening 11 of the second embodiment consists of a series of support segments which are spaced apart by notches 15 so as to form a discontinuous construction of the tapered portion 14. In this circumstance, located between the welding inner circumference 12 and the segments of the tapered portion 14 is the supporting bottom periphery 13 that can support the rear periphery 22 of the striking plate 2. In welding operation, the inert gas remained between the welding inner circumference 12 of the assembling opening 11 and the welding outer circumference 21 of the striking plate 2 can further be discharged via the notches 15 such that void defect or incomplete welding can be effectively avoided. Consequently, the welding structure of the golf club head body 1 for welding the striking plate 2 may increase welding quality, intensity and reliability.

Figure 5:
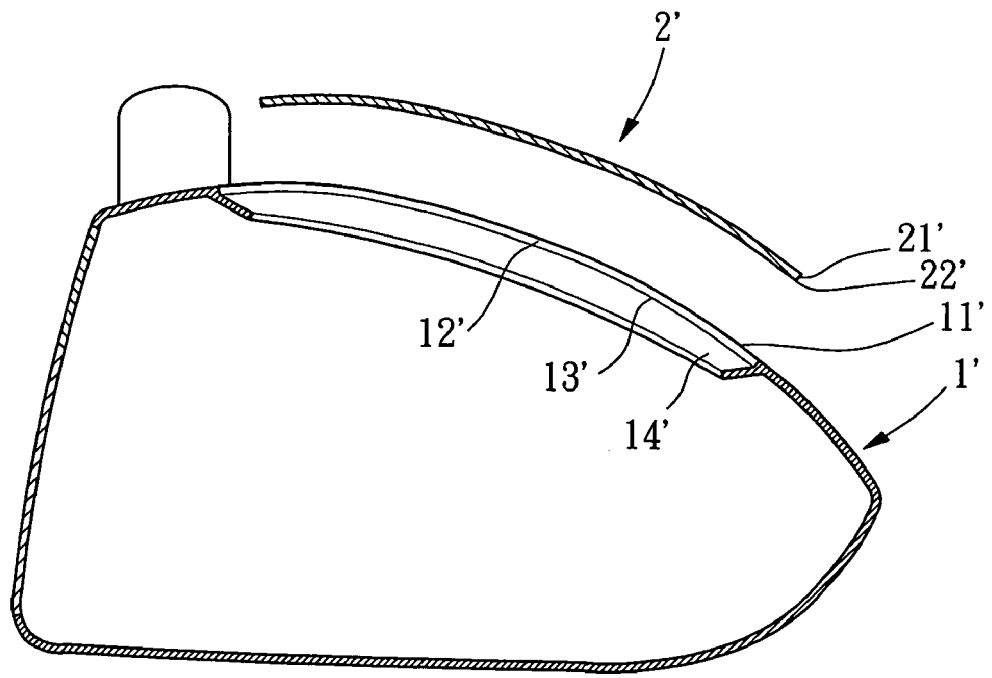
FIG. 5 is an exploded perspective view of another golf club head having a connecting structure for welding a crown component (club head component) to a golf club head body in accordance with a third embodiment of the present invention.
Figure 6:
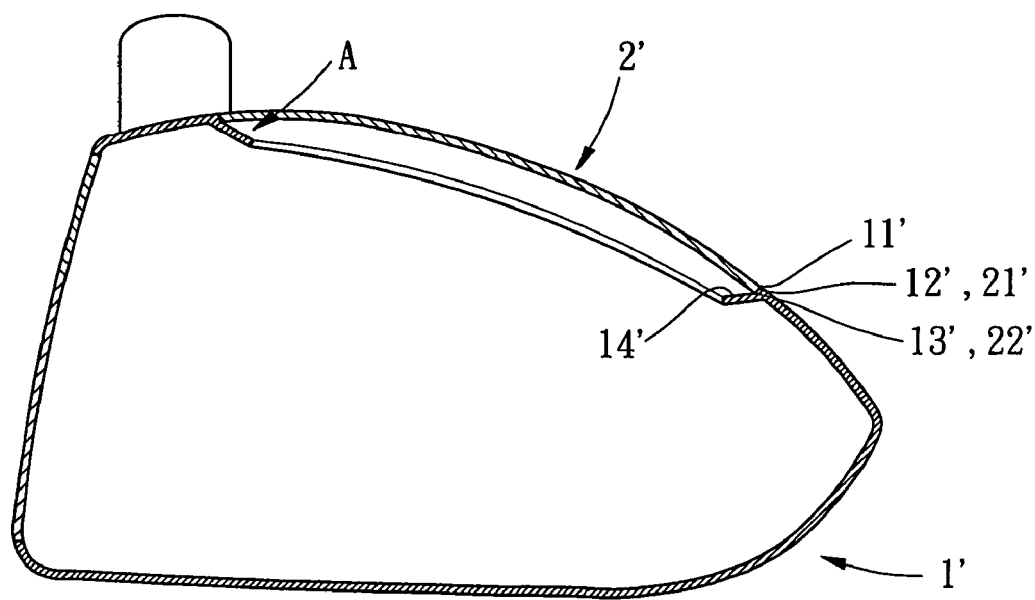
FIG. 6 is a cross-sectional view of the golf club head having the connecting structure connected the golf club head body with the crown component, in welding operation, in accordance with the third embodiment of the present invention.

Turning now to FIGS. 5 and 6, reference numerals of the third embodiment of the present invention have applied the identical numerals of the first embodiment, as shown in FIG. 1. The construction of the golf club head structure in accordance with the third embodiment of the present invention has similar configuration and same function as that of the golf club head structure of the first embodiment and detailed descriptions may be omitted.

Referring again to FIGS. 5 and 6, in comparison with the first embodiment, the golf club head body 1' of the third embodiment is a wood-type club head. The club head component of the third embodiment is a cover plate 2' received in the assembling opening 11' of the golf club head body 1' when assembled. In an alternative embodiment, the assembling opening 11' of the golf club head body 1' may be located on a position selected from a group consisting of a crown portion, a skirt portion, a sole portion and etc. In the third embodiment, the assembling opening 11' includes a welding inner circumference 12', a supporting bottom periphery 13' and a tapered portion 14', and the cover plate 2' correspondingly provides with a welding outer circumference 21' and a rear periphery 22'. The rear surface of the cover plate 2' and the tapered portion 14' of the assembling opening 11' defines a space "A" when assembled. Consequently, the welding structure of the golf club head body 1' for welding the cover plate 2' may increase welding quality, intensity and reliability.

Figure 7:
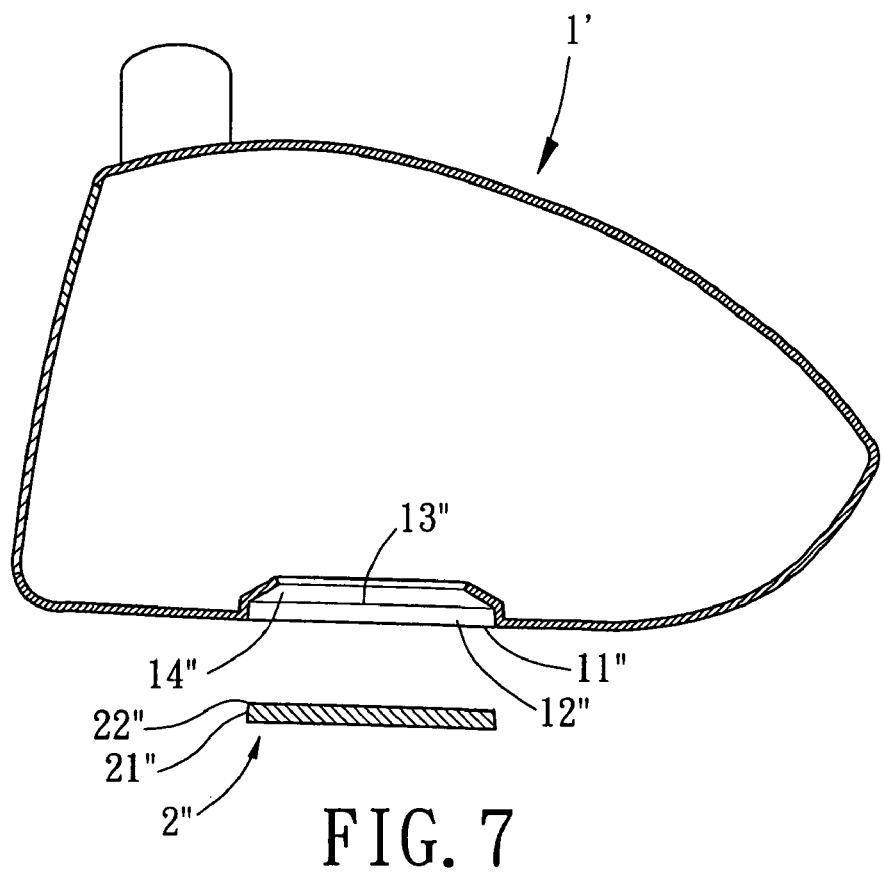
FIG. 7 is an exploded perspective view of a golf club head having a connecting structure for welding a weight component (club head component) to a golf club head body in accordance with a fourth embodiment of the present invention.
Figure 8:
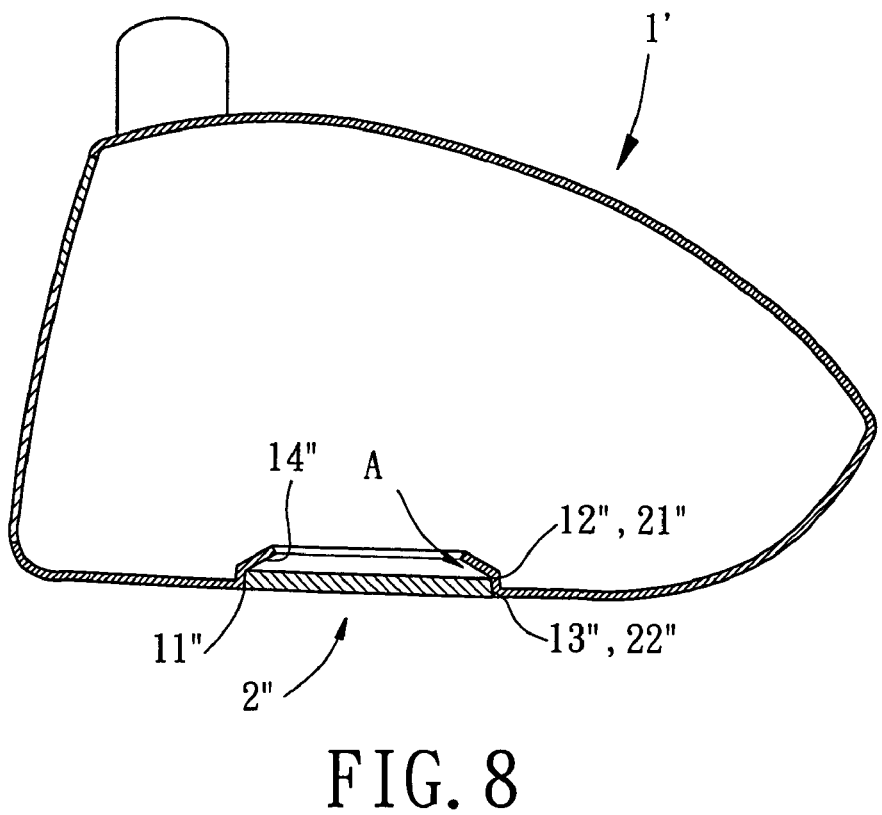
FIG. 8 is a cross-sectional view of the golf club head having the connecting structure connected the golf club head body with the weight component, in welding operation, in accordance with the fourth embodiment of the present invention.

Turning now to FIGS. 7 and 8, reference numerals of the fourth embodiment of the present invention have applied the identical numerals of the third embodiment, as shown in FIGS. 5 and 6. The construction of the golf club head structure in accordance with the fourth embodiment of the present invention has similar configuration and same function as that of the golf club head structure of the first embodiment and detailed descriptions may be omitted.

Referring again to FIGS. 7 and 8, in comparison with the third embodiment, the club head component of the fourth embodiment is a weight member 2" received in the assembling opening 11" of the golf club head body 1' when assembled. In an alternative embodiment, the weight assembling opening 11" of the golf club head body 1' may be located on a position selected from a group consisting of a crown portion, a skirt portion, a sole portion and etc. In the fourth embodiment, the weight assembling opening 11" includes a welding inner circumference 12", a supporting bottom periphery 13" and a tapered portion 14", and the weight member 2" correspondingly provides with a welding outer circumference 21" and a rear periphery 22". The rear surface of the weight member 2" and the tapered portion 14" of the weight assembling opening 11" defines a space "A" when assembled. Consequently, the welding structure of the golf club head body 1' for welding the weight member 2" may increase welding quality, intensity and reliability.

As has been discussed above, due to obstruction of the shoulder of the assembling opening, void defects may be generated in the welding portion of the conventional golf club head that causes incomplete welding if the inert gas cannot be properly released from the welding portion. Conventionally, the support ribs of the conventional striking plate and the engaging notches of the conventional golf club head body for structurally omitting the shoulder of the assembling opening may sophisticate the entire structure of the golf club head. Conversely, the connecting structure of the golf club head body 1 of the present invention, as shown in FIGS. 1 and 4, provides with the supporting bottom periphery 13 for supporting the rear periphery 22 of the striking plate 2 so that remained between the welding inner circumference 12 of the assembling opening 11 and the welding outer circumference 21 of the striking plate 2 can be discharged along the tapered portion 14. Consequently, the welding structure of the golf club head body 1 for welding the striking plate 2 may increase welding quality, intensity and reliability.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A connecting structure for a golf club head comprising:
   a club head component including a welding outer circumference and a rear periphery;
   a golf club head body provided with an assembling opening corresponding to the club head component;
   the assembling opening adapted to receive the club head component, said assembling opening including:
   a welding inner circumference engaged with a welding outer circumference of the club head component;
   a supporting bottom periphery supporting the rear periphery of the club head component; and
   a tapered portion extended inwardly and downwardly from the supporting bottom periphery to provide a space for releasing inert gas remained between the welding outer circumference of the club head component and the welding inner circumference of the assembling opening of the golf club head body in welding operation, wherein said space is in communication with an interior of the golf club head body such that the inert gas is released into the interior of the golf club head body in the welding operation.

2. The connecting structure for the golf club head as defined in claim 1, wherein the club head component is selected from a striking plate received in the assembling opening of the golf club head body located at a front side.

3. The connecting structure for the golf club head as defined in claim 1, wherein the club head component is selected from a cover plate received in the assembling opening of the golf club head body located on a crown portion, a skirt portion or a sole portion.

4. The connecting structure for the golf club head as defined in claim 1, wherein the club head component is selected from a weight member received in the assembling opening of the golf club head body located on a crown portion, a skirt portion or a sole portion.

5. The connecting structure for the golf club head as defined in claim 1, wherein the tapered portion of the assembling opening is formed with an inclined flat surface.

6. The connecting structure for the golf club head as defined in claim 1, wherein the tapered portion of the assembling opening is formed with a curved surface.

7. The connecting structure for the golf club head as defined in claim 1, wherein the tapered portion of the assembling opening continuously surrounds a rear portion thereof such that the supporting bottom periphery is continuously located between the welding inner circumference and the tapered portion.

8. The connecting structure for the golf club head as defined in claim 1, wherein the tapered portion of the assembling opening has a plurality of support segments which are spaced apart by notches so as to form a discontinuous construction of the tapered portion.

9. A connecting structure for a golf club head comprising:
   a club head component including a welding outer circumference and a rear periphery;
   a golf club head body provided with an assembling opening corresponding to the club head component;
   the assembling opening adapted to receive the club head component, said assembling opening including:
   a welding inner circumference engaged with the welding outer circumference of the club head component;
   a supporting bottom periphery supporting the roar periphery of the club head component; and
   means for releasing inert gas from a space during a welding operation, the means including a tapered portion extending inwardly and downwardly from the supporting bottom periphery to provide the space for releasing inert gas between the welding outer circumference of the club head component and the welding inner circumference of the assembling opening of the golf club head body during the welding operation, the space being in communication with an interior of the golf club head body.

10. The connecting structure for the golf club head as defined in claim 9, wherein the club head component is selected from a striking plate received in the assembling opening of the golf club head body located at a front side.

11. The connecting structure for the golf club head as defined in claim 9, wherein the club head component is selected from a cover plate received in the assembling opening of the golf club head body located on a crown portion, a skirt portion or a sole portion.

12. The connecting structure for the golf club head as defined in claim 9, wherein the club head component is selected from a weight member received in the assembling opening of the golf club head body located on a crown portion, a skirt portion or a sole portion.

13. The connecting structure for the golf club head as defined in claim 9, wherein the tapered portion of the assembling opening is formed with an inclined flat surface.

14. The connecting structure for the golf club head as defined in claim 9, wherein the tapered portion of the assembling opening is formed with a curved surface.

15. The connecting structure for the golf club head as defined in claim 9, wherein the tapered portion of the assembling opening continuously surrounds a rear portion thereof such that the supporting bottom periphery is continuously located between the welding inner circumference and the tapered portion.

16. The connecting structure for the golf club head as defined in claim 9, wherein the tapered portion of the assembling opening has a plurality of support segments which are spaced apart by notches so as to form a discontinuous construction of the tapered portion.

* * * * *